US009739132B2

(12) United States Patent
Zhou et al.

(10) Patent No.: US 9,739,132 B2
(45) Date of Patent: Aug. 22, 2017

(54) WELL TREATMENT FLUIDS AND METHODS

(71) Applicant: Baker Hughes Incorporated, Houston, TX (US)

(72) Inventors: Jia Zhou, Spring, TX (US); Magnus U. Legemah, Richmond, TX (US); Hong Sun, Houston, TX (US); Brian B. Beall, Spring, TX (US); Qi Qu, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 262 days.

(21) Appl. No.: 13/961,606

(22) Filed: Aug. 7, 2013

(65) Prior Publication Data

US 2015/0041139 A1    Feb. 12, 2015

(51) Int. Cl.
*E21B 43/267* (2006.01)
*C09K 8/68* (2006.01)
*C09K 8/90* (2006.01)
*C09K 8/88* (2006.01)

(52) U.S. Cl.
CPC ........... *E21B 43/267* (2013.01); *C09K 8/685* (2013.01); *C09K 8/887* (2013.01); *C09K 8/90* (2013.01)

(58) Field of Classification Search
None
See application file for complete search history.

(56) References Cited

U.S. PATENT DOCUMENTS

| 3,727,687 A * | 4/1973 | Clampitt | B01J 19/06 166/275 |
| 3,727,688 A * | 4/1973 | Clampitt | B01J 19/06 166/283 |
| 4,035,195 A * | 7/1977 | Podlas | C08L 1/08 507/113 |

(Continued)

FOREIGN PATENT DOCUMENTS

WO    WO2012044986    4/2012

OTHER PUBLICATIONS

Johannes Karl Fink; Petroleum Engineer's Guide to Oil Field Chemicals and Fluids; Gulf Professional Publishing; Chapter 17—Fracturing Fluids, Petroleum Engineer's Guide to Oil Field Chemicals and Fluids, 2012, Chapter Summary.

(Continued)

*Primary Examiner* — Anuradha Ahuja
(74) *Attorney, Agent, or Firm* — Parsons Behle & Latimer

(57) ABSTRACT

A well treatment fluid includes an aqueous-based fluid, a crosslinked CMHEC polymer, and a crosslinker. The CMHEC polymer exhibits a DS of 0.2 to 0.6 and a MS of 2.0 to 2.5. The well treatment fluid exhibits a viscosity of at least about 100 cP. A well treatment method includes crosslinking a CMHEC polymer in an aqueous-based fluid at a pH of at least about 6. The crosslinking increases a viscosity of the well treatment fluid to at least about 100 cP. A well is treated with the well treatment fluid at a temperature of at least about 200° F. Another well treatment method includes forming a well treatment fluid from produced water that has a TDS content of at least about 150,000 ppm. The crosslinking increases a viscosity of the well treatment fluid to at least about 100 cP.

19 Claims, 2 Drawing Sheets

(56) References Cited

U.S. PATENT DOCUMENTS

| | | | | |
|---|---|---|---|---|
| 4,151,096 | A | * | 4/1979 | Jackson .................. C09K 8/08 |
| | | | | 166/305.1 |
| 4,313,834 | A | | 2/1982 | Harris |
| 4,321,968 | A | * | 3/1982 | Clear ...................... C09K 8/10 |
| | | | | 166/275 |
| 4,413,680 | A | * | 11/1983 | Sandiford .............. C09K 8/588 |
| | | | | 166/270 |
| 4,451,389 | A | * | 5/1984 | Clear ...................... C09K 8/10 |
| | | | | 166/275 |
| 4,487,867 | A | * | 12/1984 | Almond ................. C09K 8/685 |
| | | | | 166/307 |
| 4,505,826 | A | | 3/1985 | Horton |
| 4,534,412 | A | * | 8/1985 | Dovan ................... C09K 8/887 |
| | | | | 166/294 |
| 4,552,215 | A | * | 11/1985 | Almond ............... C09K 8/5758 |
| | | | | 166/278 |
| 4,579,942 | A | * | 4/1986 | Brode ..................... C08B 11/20 |
| | | | | 106/192.1 |
| 5,067,565 | A | | 11/1991 | Holtmyer et al. |
| 5,247,995 | A | | 9/1993 | Tjon-joe-pin et al. |
| 6,138,760 | A | | 10/2000 | Lopez et al. |
| 7,632,787 | B2 | | 12/2009 | Mirakyan et al. |
| 7,718,582 | B2 | | 5/2010 | Le et al. |
| 7,795,186 | B2 | | 9/2010 | Saini et al. |
| 7,888,295 | B2 | | 2/2011 | Fu et al. |
| 7,998,909 | B2 | | 8/2011 | Lin et al. |
| 8,191,632 | B2 | | 6/2012 | Lindvig et al. |
| 8,205,675 | B2 | | 6/2012 | Brannon et al. |
| 8,207,094 | B2 | | 6/2012 | Hutchins et al. |
| 8,361,936 | B2 | | 1/2013 | Mukhopadhyay et al. |
| 8,371,383 | B2 | | 2/2013 | Bell et al. |
| 8,895,480 | B2 | * | 11/2014 | Dawson ................. C09K 8/685 |
| | | | | 166/308.1 |
| 2002/0125012 | A1 | * | 9/2002 | Dawson ................. C09K 8/887 |
| | | | | 166/300 |
| 2005/0101491 | A1 | * | 5/2005 | Vollmer .................. C08L 1/284 |
| | | | | 507/112 |
| 2008/0196893 | A1 | * | 8/2008 | Berger ................... C09K 8/602 |
| | | | | 166/270.1 |
| 2010/0048429 | A1 | | 2/2010 | Dobson et al. |
| 2011/0053807 | A1 | * | 3/2011 | Panga .................... C04B 28/02 |
| | | | | 507/115 |
| 2012/0190595 | A1 | | 7/2012 | Welton et al. |
| 2012/0289436 | A1 | | 11/2012 | Woodward et al. |
| 2014/0034323 | A1 | * | 2/2014 | Dobson, Jr. ............. C09K 8/90 |
| | | | | 166/308.5 |

OTHER PUBLICATIONS

International Searching Authority; International Search Report and Written Opinion issued in PCT/US2014/049850; dated Nov. 18, 2014.

Johannes Karl Fink; Petroleum Engineer's Guide to Oil Field Chemicals and Fluids; Gulf Professional Publishing; Chapter 17—Fracturing Fluids, Petroleum Engineer's Guide to Oil Chemicals and Fluids, 2012; Summary.

* cited by examiner

WELL TREATMENT FLUIDS AND METHODS

TECHNICAL FIELD

The embodiments herein pertain to well treatment fluids and methods, such as those using a carboxymethyl hydroxyethyl cellulose (CMHEC) polymer.

BACKGROUND

Wells drilled in low-permeability subterranean formations are often treated by reservoir stimulation techniques, such as hydraulic fracturing, to increase hydrocarbon production rate. High viscosity fluids may be employed to carry proppant down-hole to prop open fractures in the formation. Known linear gels (water containing a gelling agent only) that can be operated at ambient temperature at the surface generally do not exhibit a sufficiently high viscosity to transfer proppant of a large size or large quantity. Consequently, crosslinkers may be used to increase fluid viscosity, providing adequate transport of larger proppant sizes or larger proppant quantity. Higher viscosity fluids also create wider fractures within the formation.

Guar and guar derivatives are among the most oft used polymers in hydraulic fracturing treatment. Guar derivatives, such as carboxymethyl guar (CMG) and carboxymethyl hydroxypropyl guar (CMHPG), are predominantly used in wells with a high bottom-hole temperature (BHT). In recent years, significant price increases in guar and supply shortages of guar have posed challenges for service companies and operators. Consequently, prices for guar derivatives have also increased. Interest in cellulose derivatives has increased for fracturing treatment due to the natural abundance of cellulose. However, known systems for incorporating cellulose derivatives crosslink the polymers only in a low pH environment. Also, known systems for using cellulose derivatives are limited to applications in which formation temperature is less than 250° F. due to rapid acid hydrolysis at higher temperatures.

In addition, fluid volumes in fracturing treatments have increased substantially, while public concern for water use and disposal has also increased. Rather than paying to treat and dispose of produced and flowback water, service companies and operators have pursued recycling in subsequent stimulation operations. "Produced water" refers to water generated from hydrocarbon wells. Generally the term is used in the oil industry to describe water that is produced along with oil and/or gas. "Flowback water" is a subcategory of produced water referring to fracturing fluid that flows back through the well, which may account for some fraction of the original fracture fluid volume.

Produced water, especially from shale plays such as Marcellus and Bakken, is known for its high total dissolved solids (TDS) and high divalent cation content. TDS and divalent cations pose challenges for known guar- and guar derivative-based fracturing fluids. Consequently, produced water intended for recycling in subsequent stimulation operations is treated to obtain a water quality suitable for the fracturing fluids. Even so, such treatment is often cost-prohibitive and time-consuming. Accordingly, other fluids suitable for higher formation temperatures, recycling of produced water, or both are desirable.

SUMMARY

A well treatment fluid includes an aqueous-based fluid, a crosslinked CMHEC polymer, and a crosslinker. The CMHEC polymer exhibits a degree of substitution (DS) of 0.2 to 0.6 and a molar substitution (MS) of 2.0 to 2.5. The crosslinker is configured to crosslink the CMHEC polymer in the aqueous-based fluid. The well treatment fluid exhibits a viscosity of at least about 100 cP at a sheer rate of 100 $sec^{-1}$.

A well treatment method includes forming a well treatment fluid by combining ingredients including an aqueous-based fluid, a CMHEC polymer, and a crosslinker. The method includes crosslinking the CMHEC polymer in the aqueous-based fluid at a pH of at least about 6 using the crosslinker. The crosslinking increases a viscosity of the well treatment fluid to at least about 100 cP at a sheer rate of 100 $sec^{-1}$. A well is treated with the well treatment fluid exhibiting the increased viscosity at a temperature of at least about 200° F.

Another well treatment method includes forming a well treatment fluid by combining ingredients including an aqueous-based fluid, a CMHEC polymer, and a crosslinker. The aqueous-based fluid is formed from produced water that has a TDS content of at least about 150,000 ppm and the CMHEC polymer exhibits a DS of 0.3 to 0.5 and a MS of 2.0 to 2.5. The method includes crosslinking the CMHEC polymer in the aqueous-based fluid using the crosslinker. The crosslinking increases a viscosity of the well treatment fluid to at least about 100 cP at a sheer rate of 100 $sec^{-1}$. A well is treated with the well treatment fluid exhibiting the increased viscosity.

BRIEF DESCRIPTION OF THE DRAWINGS

Some embodiments are described below with reference to the following accompanying drawings.

DETAILED DESCRIPTION

Discoveries are described herein that allow use of CMHEC polymer in well treatment fluids and methods, such as for well stimulation. Although previous use of cellulose derivatives has been limited to applications crosslinked in a low pH environment and formation temperatures less than 250° F., fluids and methods herein are not so limited. Additionally, discoveries described herein allow use of high TDS produced water as aqueous-based fluid of the well treatment fluid. The produced water may also have a high divalent cation content.

One polymer shown effective in providing such benefits includes CMHEC polymer exhibiting a degree of substitution (DS) of 0.2 to 0.6 and a molar substitution (MS) of 2.0 to 2.5 available from Ashland, Inc. in Wayne, N.J. Accordingly, in one embodiment, a well treatment fluid includes an aqueous-based fluid, a crosslinked CMHEC polymer, and a crosslinker. The CMHEC polymer exhibits a DS of 0.2 to 0.6 and a MS of 2.0 to 2.5. The crosslinker is configured to crosslink the CMHEC polymer in the aqueous-based fluid. The well treatment fluid exhibits a viscosity of at least about 100 cP. Unless stated otherwise, viscosities of the well treatment fluid indicated herein are exhibited at a sheer rate of 100 sec$^{-1}$. At a higher sheer rate, the viscosity exhibited may be lower.

By way of example, the aqueous-based fluid may include produced water. The produced water included in the aqueous-based fluid may have a TDS content of at least about 150,000 ppm. The produced water included in the aqueous-based fluid may have a divalent cation content as $CaCO_3$ of at least about 25,000 ppm. According to industry practice, divalent cation content may be determined by measuring the content of all divalent cations, but expressed as equivalent $CaCO_3$ (hardness) content as done herein. Depending on what proportions of the aqueous-based fluid are sourced from produced water and fresh water, the well treatment fluid may have a TDS content of at least about 100,000 ppm and a divalent cation content as $CaCO_3$ of at least about 10,000 ppm. TDS and divalent cation content may be higher for an increasing proportion of produced water, such as when the aqueous-based fluid is substantially all produced water. Accordingly, well treatment fluid TDS and divalent cation content may be least about 150,000 ppm and at least about 25,000 ppm, respectively.

Observation has indicated that CMHEC polymer exhibiting a DS of 0.3 to 0.5 and a MS of 2.0 to 2.5 is suitable to increase viscosity of well treatment fluid to at least about 100 cP even when using produced water with the described TDS content and divalent cation content. Outside of the DS/MS ranges specified, a significant viscosity drop occurs. It follows that such a well treatment fluid may enable recycling of produced water, including flowback water, in subsequent stimulation operations. Such recycling has previously posed challenges for known guar- and guar derivative-based fracturing fluids.

Figure 3:
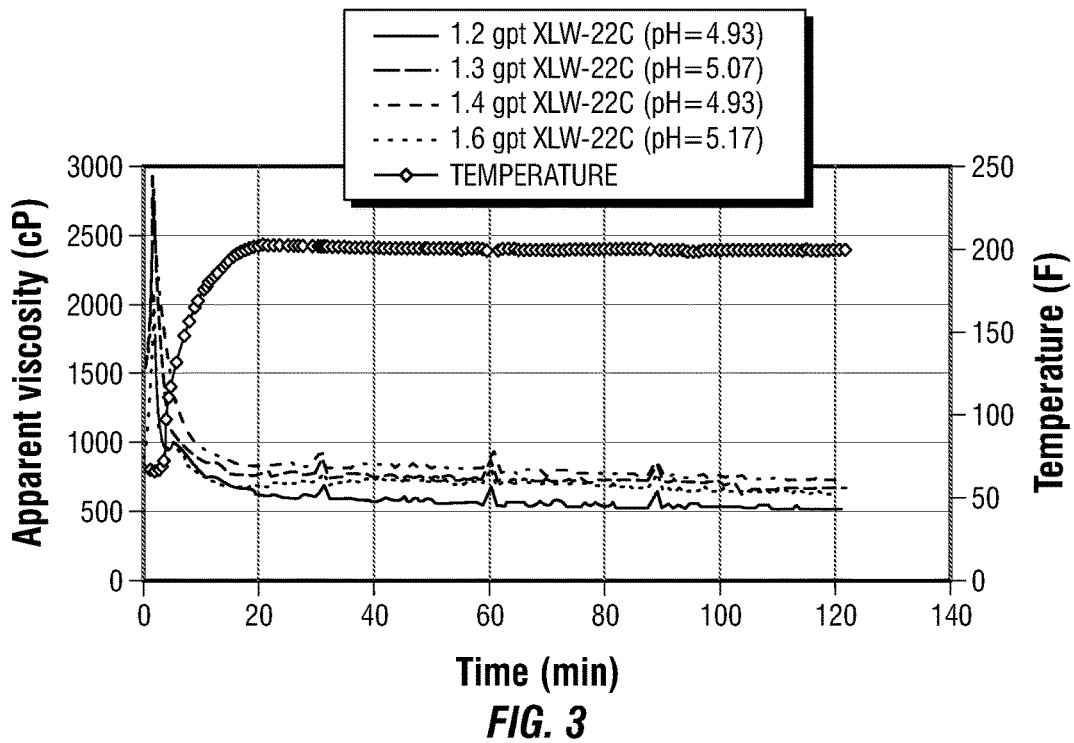
FIG. 3 is a rheology profile graph for CMHEC at 40 ppt in produced water using various concentrations of crosslinker at 200° F. The pH varies slightly between 4.93 and 5.17.

Although known formulations for well treatment fluids may be able to produce a momentary spike in viscosity, a benefit exists in a sustained increase in viscosity that endures throughout a stimulation process, as needed. The well treatment fluid described herein may exhibit the viscosity of at least about 100 cP for a time of at least about 2 hours. (See FIG. 3). Known compositions and/or techniques for delaying the development of viscosity may be used to produce a desired time delay in reaching the viscosity of at least about 100 cP. Known breakers or other breaking techniques may be used to decrease viscosity at the appropriate time during a stimulation process. The crosslinker may include a zirconium crosslinker. Other crosslinkers or metal crosslinkers, such as aluminum or titanium, may also be suitable.

Additionally, the well treatment fluid may exhibit a pH of at least about 6, for example, from about 6 to about 11, including greater than 7 to about 11, such as greater than 7 to about 9. The well treatment fluid may exhibit the viscosity of at least about 100 cP even when at a temperature of at least about 200° F., for example, at least about 250° F., including at least about 275° F. and at least about 300° F.

Magnesium oxide (MgO) has shown effectiveness in producing the pH of at least about 6. MgO dissolves slowly in the well treatment fluid to produce magnesium hydroxide $Mg(OH)_2$ and keep pH at about 6 or higher. MgO solubility increases with increasing temperature, which corresponds with polymer hydrolysis that may occur at increasing temperature. Accordingly, MgO may be added to a well treatment fluid after combining aqueous-based fluid, CMHEC polymer, and crosslinker. MgO does not significantly dissolve in the aqueous-based fluid at temperatures less than 200° F. However, as temperature increases with increasing well depth, the risk of polymer hydrolysis at increasing temperatures also increases. MgO dissolves significantly at temperatures of at least about 200° F., maintaining the pH of at least about 6, for example greater than 7, and reducing polymer hydrolysis at depth. Other inorganic compounds, such as oxides of Group I and II elements, may also be suitable for similar purposes.

A well treatment fluid system may incorporate the CMHEC polymer and already including buffers or other components configured to maintain a pH of at least about 6. In such circumstance, adding MgO may be unnecessary and the CMHEC polymer may be exposed to temperatures of at least about 250° F. without polymer hydrolysis. However, MgO is available as an option for inclusion in well treatment fluid systems that are not configured to maintain pH of at least about 6 at increased temperatures encountered at depth.

U.S. Pat. No. 4,313,834 issued to Harris describes a treating fluid including an aqueous fluid, CMHEC having a DS of about 0.25 to 0.6 and a MS of about 1 to 3, and zirconium oxychloride crosslinker. Even so, Harris describes crosslinking in the presence of acid at a pH below about 7. Also, acceptable operation temperatures and viscosities produced are significantly lower in Harris compared to those described for the embodiments herein. As a result, the embodiments herein represent significant benefits in comparison to known well treatment fluids.

As stated above, the well treatment fluid may exhibit the increased viscosity for an extended time. Further, the viscosity may be exhibited even during exposure to increased temperature. For example, the well treatment fluid may exhibit the viscosity of at least about 100 cP for a time of at least about 2 hours when at a temperature of at least about 275° F. (See FIG. 1). Also, the well treatment fluid may exhibit the viscosity of at least about 100 cP for a time of at least about 1 hour when at a temperature of at least about 300° F. (See FIG. 2).

The structure of the CMHEC polymer described herein allows for crosslinking at a higher pH. Use of the higher pH further provides increased stability at increased temperatures. For that reason, the problems of known cellulose derivatives crosslinked under low pH conditions and subject to rapid hydrolysis at high temperatures may be overcome. Further, the DS/MS parameters of the CMHEC polymer afford the benefit of using produced water as the aqueous-based fluid.

It will be appreciated, according to another embodiment, that a well treatment method includes forming a well treatment fluid by combining ingredients including an aqueous-based fluid, a CMHEC polymer, and a crosslinker. The method includes crosslinking the CMHEC polymer in the aqueous-based fluid at a pH of at least about 6 using the crosslinker. The crosslinking increases a viscosity of the well treatment fluid to at least about 100 cP at a sheer rate of 100 sec$^{-1}$. A well is treated with the well treatment fluid exhibiting the increased viscosity at a temperature of at least about 200° F.

By way of example, the method may further include fracturing a subterranean formation using the well treatment fluid. The aqueous-based fluid may include produced water, such as produced water having the characteristics described above. Also, the CMHEC polymer may exhibit a DS of 0.3 to 0.5 and a MS of 2.0 to 2.5 beneficial for use with produced water. A crosslinker such as described above may further be used and pH values may range as described above. However, pH may instead range from about 3 to about 11 when using produced water.

The method may further include combining MgO as an additional ingredient before the crosslinking and maintaining the pH of at least about 6 at least up to when the crosslinking occurs. The temperature may be at least about 250° F. The well treatment fluid may exhibit the property of stabilizing the increased viscosity of at least about 100 cP for the times and at the temperatures described above.

According to a further embodiment, a well treatment method includes forming a well treatment fluid by combining ingredients including an aqueous-based fluid, a CMHEC polymer, and a crosslinker. The aqueous-based fluid is formed from produced water that has a TDS content of at least about 150,000 ppm and the CMHEC polymer exhibits a DS of 0.3 to 0.5 and a MS of 2.0 to 2.5. The method includes crosslinking the CMHEC polymer in the aqueous-based fluid using the crosslinker. The crosslinking increases a viscosity of the well treatment fluid to at least about 100 cP at a sheer rate of 100 sec$^{-1}$. A well is treated with the well treatment fluid exhibiting the increased viscosity.

By way of example, the method may further include fracturing a subterranean formation using the well treatment fluid. Also, the produced water may have a divalent cation content of at least about 25,000 ppm. The well treatment fluid may have a TDS content of at least about 100,000 ppm and a divalent cation content as $CaCO_3$ of at least about 10,000 ppm. Also, the crosslinker may be selected from the crosslinkers described above. The well treatment fluid may exhibit the property of stabilizing the increased viscosity of at least about 100 cP for a time of at least about 2 hours.

EXAMPLE 1

CMHEC with DS=0.42 and MS=2.30 was hydrated in water of different qualities. 1.2 grams (g) CMHEC linear gel was added in 250 milliliters (mL) water placed in a blender and mixed at 1500 revolutions per minute (rpm) for 3 minutes (min). Viscosity of the linear gel was then measured with an OFITE M900 viscometer available from OFI Testing Equipment, Inc. in Houston, Tex. Table 1 shows viscosity for 40 ppt linear gel after 3 minutes of blending at 1500 rpm in Tomball tap water, 2% KCl water solution, and 2% $CaCl_2$ water solution. The "as-is" pH was 8.5. Table 1 illustrates that CMHEC polymer tolerates various waters well and fully hydrates in 3 min blending at 1500 rpm even without pH adjustment.

TABLE 1

| OFITE M900 Viscosity (at 300 rpm) | | | | | |
|---|---|---|---|---|---|
| in Tomball tap | | in 2% KCl | | in 2% $CaCl_2$ | |
| as-is | pH~5.0 | as-is | pH~5.0 | as-is | pH~5.0 |
| 40 | 40 | 36 | 39 | 39 | 37 |

EXAMPLE 2

Figure 1:
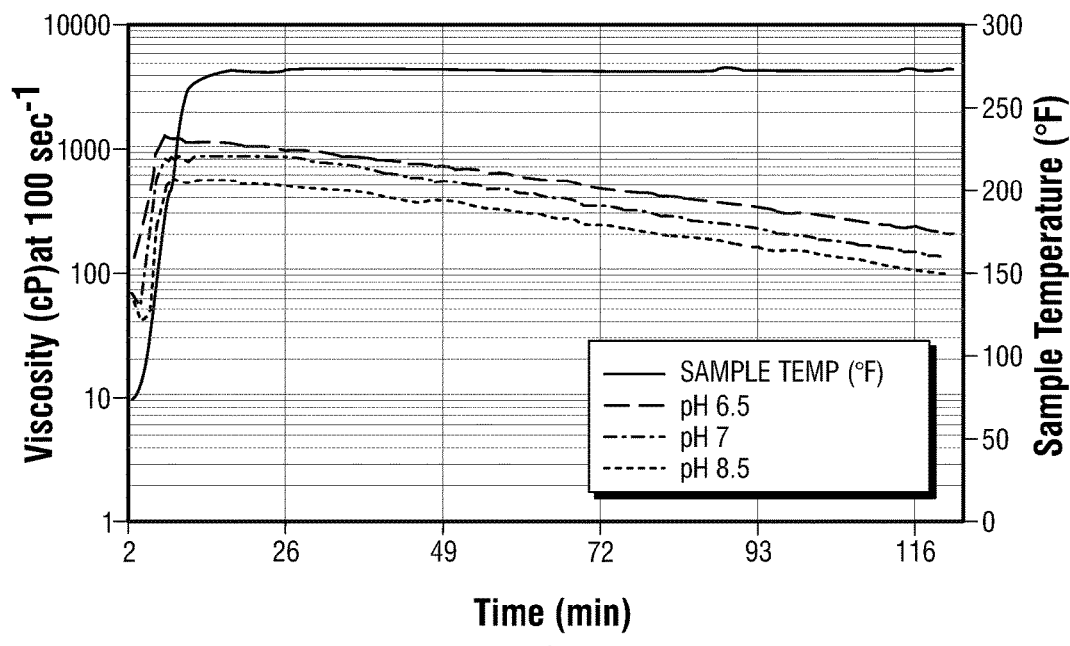
FIG. 1 is a rheology profile graph for CMHEC at 40 pounds per thousand gallons (ppt) at various pH levels and 275° F.

The CMHEC of Example 1 was tested as a crosslinked fluid. 40 ppt CMHEC linear gel hydrated in Tomball, Tex. tap water was adjusted to different pH values (6.5-8.5) using BF-55L acid buffer available from Baker Hughes, Inc. in Houston, Tex. 3.0 gallons per thousand gallons (gpt) zirconium-based crosslinker (XLW-22C available from Baker Hughes, Inc.) and 3 gpt gel stabilizer (GS-1 L available from Baker Hughes, Inc.) were added to the fluid and it was tested on a M5500 rheometer (available from Grace Instrument Co. in Houston, Tex.) at 275° F. As shown in FIG. 1, the fluid system maintained viscosity higher than 200 cP at 100 s$^{-1}$ after 2 hours at pH=6.5, higher than 150 cP at pH=7, and higher than 100 cP at pH=8.5.

EXAMPLE 3

Figure 2:
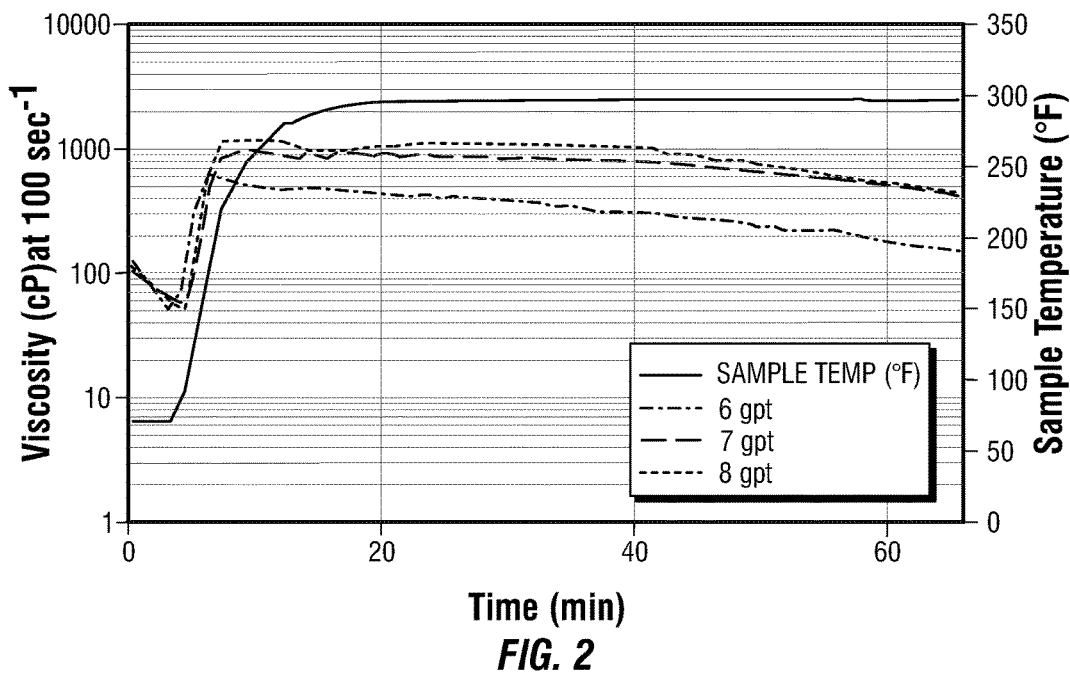
FIG. 2 is a rheology profile graph for CMHEC at 50 ppt using various concentrations of crosslinker at pH 8.5 and 300° F.

The CMHEC of Example 1 was further tested as a crosslinked fluid. 50 ppt hydrated CMHEC linear gel in Tomball, Tex. tap water was adjusted to pH 8.5 and then added with 3 gpt gel stabilizer (GS-1 L). The linear gel was crosslinked with various loadings of crosslinker (XLW-22C) and resultant fluids were tested at 300° F. on a Model 5550 viscometer available from Chandler Engineering in Broken Arrow, Okla. As shown in FIG. 2, fluid with 7 gpt and 8 gpt XLW-22C maintained viscosity over 500 cP for about 1 hour at temperature, indicating tremendous thermal stability. The 6 gpt sample stably maintained viscosity at over 200 cP.

EXAMPLE 4

A produced water sample was analyzed (see Table 2) from Kansas with TDS over 200,000 ppm and total hardness as $CaCO_3$ above 40,000 ppm as representative water. Laboratory testing demonstrated that CMHEC can be fully hydrated within 3 minutes (see Table 3) after 3 minutes blending at 1500 rpm, similar to the hydration rate of guar in fresh water.

TABLE 2

| Temp (F.): 72 | |
|---|---|
| pH: 5.73 | |
| Specific Gravity: 1.1421 | |
| Contents | mg/L |
| Sodium (calc.) | 68,692 |
| Calcium | 13,200 |
| Magnesium | 2,433 |
| Barium | <5 |
| Potassium | 475 |
| Iron | 15 |
| Boron | 21 |
| Si | 80 |
| Chloride | 136,750 |
| Sulfate | 615 |
| Carbonate | <1 |
| Bicarbonate | 51 |
| Total Dissolved Solids (calc.) | 222,232 |
| Total Hardness as $CaCO_3$ | 42,981 |

TABLE 3

| | OFITE M900 Viscosity (cP) (at 300 rpm RT). | |
|---|---|---|
| Sample | in Tomball tap water 3 min | in Kansas produced water 3 min |
| 25 ppt CMHEC | 23 | 33 |
| 40 ppt CMHEC | 40 | 65 |

Furthermore, 40 ppt linear gel thus obtained from the above produced water was pH adjusted with 0.2 gpt BF-55L, added with 1.0 gpt XLD-1 crosslinking delayer available from Baker Hughes, Inc. in Houston, Tex., and crosslinked with varying concentrations of zirconium crosslinker XLW-22C. The crosslinked gel was tested at 200° F. on a FANN Model 50 rheometer available from Fann Instrument Co. in Houston, Tex. The rheology shown in FIG. 3 demonstrates that the crosslinked fluid functions well in the aforementioned produced water and the fluid is stable for at least 2 hours.

EXAMPLE 5

Figure 4:
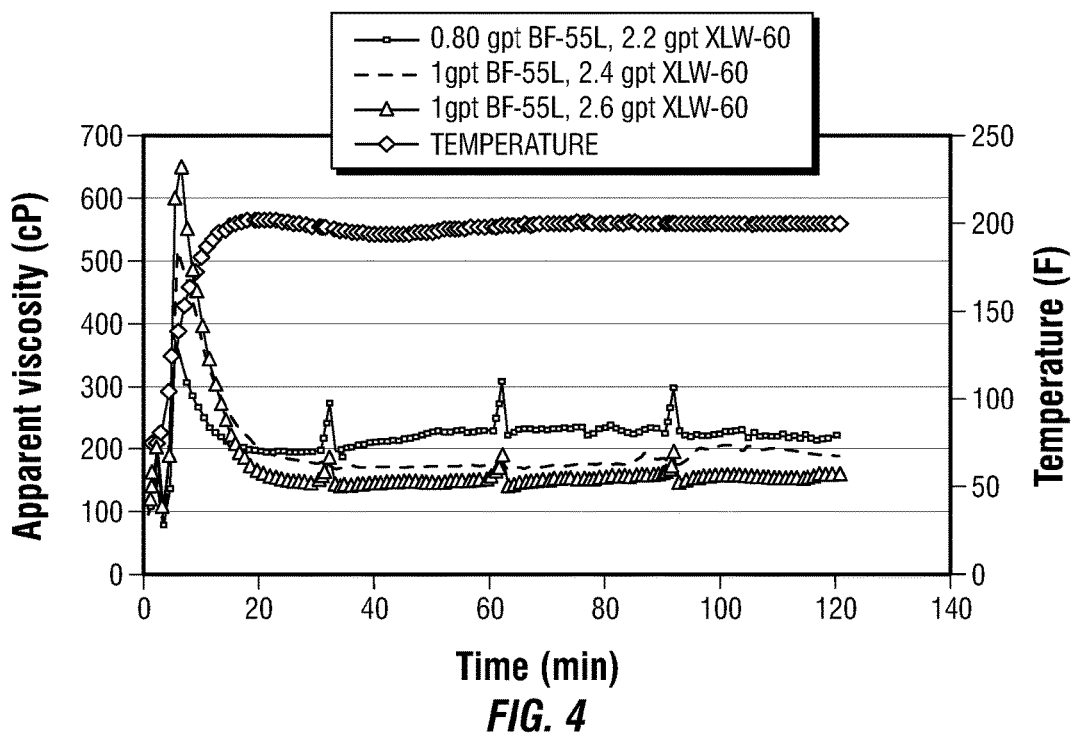
FIG. 4 is a rheology profile graph for CMHEC at 40 ppt in produced water using various concentrations of delayed crosslinker at 200° F. The pH varies slightly between 5.4 and 5.8.

40 ppt linear gel obtained from the above produced water was pH adjusted with BF-55L, added with 1.0 gpt XLD-1 and 0.5 gpt FP-12L anti-foamer available from Baker Hughes, Inc., and crosslinked with varying concentrations of delayed zirconium crosslinker XLW-60 available from Baker Hughes, Inc. The pH ranged from 5.4 to 5.8. The crosslinked gel was tested at 200° F. on a FANN Model 50 rheometer. The rheology shown in FIG. 4 demonstrates that the crosslinked fluid functions well in the aforementioned produced water with delayed crosslinker and the fluid viscosity is stable for at least 100 minutes. The high spikes in viscosity are caused by shear sweeps during the measurements at about 0, 30, 60, and 90 min.

EXAMPLE 6

A 250 ml portion of the 40 ppt CMHEC base gel of Example 5 was measured into a clean WARING™ blender jar (Waring Commercial, Torrington, Conn.). Agitation was started and the rate was adjusted at 1500 rpm to expose the blade nut and also for the reproducibility of the tests. An amount of buffer was added into the edge of the vortex of the base gel to get the designed pH. An amount of crosslinker delayer or divalent ion inhibitor could be added into the edge of the vortex of the base gel. An amount of crosslinker was injected into the edge of the vortex of the base gel and a stopwatch, which set time to 0, immediately started. When the viscosity increased sufficiently to allow the fluid to cover the blade nut and the vortex remained closed, the time was recorded. The time difference between the start of the stopwatch and the time the vortex remained closed is the vortex closure time. If the vortex did not close within 600 sec, the test for a sample was discontinued and a vortex closure time of greater than 600 sec was recorded. Such vortex closure tests demonstrated whether the polymer crosslinking time could be controlled.

Table 4 shows vortex closure data at 1500 rpm for 40 ppt CMHEC in Tomball tap water with buffer BF-10L (acetic acid) and crosslinker XLW-22C at room temperature.

TABLE 4

| Crosslinker | Additives | Vortex Closure (s) | Gel pH |
| --- | --- | --- | --- |
| XLW-22C | BF-10L, 3 gpt XLW-22C | <2 | 4.53 |
| XLW-22C | BF-10L, 3 gpt XLW-22C | <2 | 5.05 |
| XLW-22C | BF-10L, 3 gpt XLW-22C | 10 | 5.58 |
| XLW-22C | BF-10L, 3 gpt XLW-22C | 220 | 5.90 |
| XLW-22C | BF-10L, 3 gpt XLW-22C | >600 | 6.58 |
| XLW-22C | BF-10L, 3 gpt XLW-22C | >600 | 7.59 |
| XLW-22C | BF-10L, 3 gpt XLW-22C | >600 | 8.60 |

Table 5 shows vortex closure data at 1500 rpm for 40 ppt CMHEC in produced water with non-delayed crosslinker, XLW-22C, delayed crosslinkers, XLW-60 and XLW-57, at acidic condition and at room temperature. XLW-22C is a non-delayed crosslinker mixture of zirconium at acidic condition. XLW-60 is a delayed crosslinker mixture of zirconium and titanium and XLW-57 is a delayed crosslinker of zirconium. All crosslinkers are available from Baker Hughes.

TABLE 5

| Crosslinker | Additives | Vortex Closure (s) | Gel pH |
| --- | --- | --- | --- |
| XLW-22C | 0.8 gpt BF-55L, 1 gpt XLD-1, 1.4 gpt XLW-22C | <2 | 4.93 |
| XLW-60 | 0.8 gpt BF-55L, 1 gpt XLD-1, 2.2 gpt XLW-60 | >600 | 5.80 |
| | 1.2 gpt BF-55L, 1 gpt XLD-1, 2.2 gpt XLW-60 | 84 | 5.22 |
| XLW-57 | 0.6 gpt BF-55L, 1 gpt XLD-1, 1.4 gpt XLW-57 | 60 | 5.05 |
| | 0.8 gpt BF-55L, 1 gpt XLD-1, 1.4 gpt XLW-57 | 11 | 4.98 |

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A well treatment method comprising:
    forming a well treatment fluid by combining ingredients including an aqueous-based fluid, a carboxymethyl hydroxyethyl cellulose (CMHEC) polymer, and a crosslinker, the aqueous-based fluid containing produced water, the well treatment fluid having a total dissolved solids (TDS) content of at least 100,000 ppm, and the CMHEC polymer exhibiting a degree of substitution (DS) of 0.3 to 0.5 and a molar substitution (MS) of 2.0 to 2.5;
    crosslinking the CMHEC polymer in the aqueous-based fluid at a pH of at least about 6 using the crosslinker, the crosslinking increasing viscosity of the well treatment fluid to a sustained viscosity of greater than or equal to about 100 cP at a shear rate of 100 $sec^{-1}$; and
    treating a well with the well treatment fluid at a temperature of at least about 200° F. while the well treatment fluid exhibits the sustained viscosity, the well treatment fluid exhibiting a property of stabilizing the sustained viscosity of greater than or equal to about 100 cP at a shear rate of 100 $sec^{-1}$ for a time of at least about 1 hour when at the temperature of at least about 200° F.

2. The method of claim 1 wherein the pH is from about 6 to less than 7.

3. The method of claim 2 wherein the well treatment fluid has a total dissolved solids (TDS) content of at least about 150,000 ppm.

4. The method of claim 1 wherein the well treatment fluid has a divalent cation content as $CaCO_3$ of at least about 10,000 ppm.

5. The method of claim 1 wherein the well treatment fluid exhibits a property of stabilizing the sustained viscosity of greater than or equal to about 100 cP at a shear rate of 100 $sec^{-1}$ for a time of at least about 2 hours when at the temperature of at least about 200° F.

6. The method of claim 5 wherein the temperature is at least 250° F.

7. The method of claim 1 wherein the well treatment fluid further comprises $Mg(OH)_2$.

8. The method of claim 1 wherein the pH is from greater than 7 to about 11.

9. The method of claim 1 further comprising combining MgO as an additional ingredient before the crosslinking and maintaining the pH of at least about 6 at least up to when the crosslinking occurs.

10. The method of claim 1 wherein the temperature is at least about 300° F.

11. The method of claim 1 wherein the well treatment fluid exhibits a property of stabilizing the sustained viscosity of greater than or equal to about 100 cP at a shear rate of 100 $sec^{-1}$ for a time of at least about 2 hours when at a temperature of at least about 275° F.

12. The method of claim 1 wherein the well treatment fluid exhibits a property of stabilizing the sustained viscosity of greater than or equal to about 100 cP at a shear rate of 100 $sec^{-1}$ for a time of at least about 1 hour when at a temperature of at least about 300° F.

13. A well treatment method comprising:
forming a well treatment fluid by combining ingredients including an aqueous-based fluid, a carboxymethyl hydroxyethyl cellulose (CMHEC) polymer, and a crosslinker, the aqueous-based fluid being formed from produced water, the well treatment fluid having a total dissolved solids (TDS) content of at least about 150,000 ppm, and the CMHEC polymer exhibiting a degree of substitution (DS) of 0.3 to 0.5 and a molar substitution (MS) of 2.0 to 2.5;
crosslinking the CMHEC polymer in the aqueous-based fluid using the crosslinker, the crosslinking increasing viscosity of the well treatment fluid to a sustained viscosity of greater than or equal to about 100 cP at a shear rate of 100 $sec^{-1}$; and
treating a well by fracturing a subterranean formation with the well treatment fluid at a temperature of at least about 200° F. while the well treatment fluid exhibits the sustained viscosity, the well treatment fluid exhibiting a property of stabilizing the sustained viscosity of greater than or equal to about 100 cP at a shear rate of 100 $sec^{-1}$ for a time of at least about 1 hour when at the temperature of at least about 200° F.

14. The method of claim 13 wherein the well treatment fluid has a divalent cation content as $CaCO_3$ of at least about 25,000 ppm.

15. The method of claim 13 wherein the well treatment fluid has a divalent cation content as $CaCO_3$ of at least about 10,000 ppm.

16. The method of claim 13 wherein the well treatment fluid exhibits a property of stabilizing the sustained viscosity of greater than or equal to about 100 cP at a shear rate of 100 $sec^{-1}$ for a time of at least about 2 hours when at the temperature of at least about 200° F.

17. The method of claim 16 wherein the temperature is at least 250° F.

18. The method of claim 13 wherein the well treatment fluid exhibits a property of stabilizing the sustained viscosity of greater than or equal to about 100 cP at a shear rate of 100 $sec^{-1}$ for a time of at least about 2 hours when at a temperature of at least about 275° F.

19. The method of claim 13 wherein the well treatment fluid exhibits a property of stabilizing the sustained viscosity of greater than or equal to about 100 cP at a shear rate of 100 $sec^{-1}$ for a time of at least about 1 hour when at a temperature of at least about 300° F.

* * * * *